US009928649B2

United States Patent
Hu et al.

(10) Patent No.: US 9,928,649 B2
(45) Date of Patent: Mar. 27, 2018

(54) INTERFACE FOR PLANNING FLIGHT PATH

(71) Applicant: Amber Garage, Inc., Atherton, CA (US)

(72) Inventors: Botao Hu, Atherton, CA (US); Jiajie Zhang, Atherton, CA (US)

(73) Assignee: Amber Garage, Inc., Atherton, CA (US)

( * ) Notice: Subject to any disclaimer, the term of this patent is extended or adjusted under 35 U.S.C. 154(b) by 0 days.

(21) Appl. No.: 15/130,619

(22) Filed: Apr. 15, 2016

(65) Prior Publication Data
US 2017/0039764 A1    Feb. 9, 2017

Related U.S. Application Data

(60) Provisional application No. 62/200,128, filed on Aug. 3, 2015.

(51) Int. Cl.
*G06T 19/00* (2011.01)
*G06T 17/05* (2011.01)
(Continued)

(52) U.S. Cl.
CPC ........... *G06T 19/003* (2013.01); *G01C 21/20* (2013.01); *G06F 3/04815* (2013.01);
(Continued)

(58) Field of Classification Search
None
See application file for complete search history.

(56) References Cited

U.S. PATENT DOCUMENTS 8,751,159 B2    6/2014    Hall
8,964,052 B1 *  2/2015    Wooley ............... H04N 5/232
                                                348/14.03
(Continued)

FOREIGN PATENT DOCUMENTS

| CN | 102662179 | 9/2012 |
|----|-----------|--------|
| WO | 2014075609 | 5/2014 |
| WO | 2015105886 | 7/2015 |

OTHER PUBLICATIONS

Flight planning & control software by eMotion, senseFly, Mar. 25, 2015; Retrieved from: https://web.archive.org/web/20150325133224/https://www.sensefly.com/drones/emotion.html, pp. 1-3.

(Continued)

*Primary Examiner* — Barry Drennan
*Assistant Examiner* — Jason Pringle-Parker
(74) *Attorney, Agent, or Firm* — Van Pelt, Yi & James LLP

(57) ABSTRACT

A flight path of a physical aircraft vehicle is planned. A virtual three-dimensional model of a physical environment is provided. A placement indicator is tracked within the virtual three-dimensional model of the physical environment. Tracking the placement indicator includes tracking a location and an orientation of the placement indicator within the virtual three-dimensional model. A viewfinder display window that displays a simulated image captured from a simulated camera of a simulated vehicle located at the location of the placement indicator and oriented at a direction of the orientation of the placement indicator is provided. For the physical aircraft vehicle, at least a flight path and a camera image capture are planned using the placement indicator and the viewfinder display window within the virtual three-dimensional model.

20 Claims, 8 Drawing Sheets

(51) Int. Cl.
*G06T 13/20* (2011.01)
*G06F 3/0484* (2013.01)
*G01C 21/20* (2006.01)
*G08G 5/00* (2006.01)
*G06F 3/0481* (2013.01)

(52) U.S. Cl.
CPC .......... *G06F 3/04845* (2013.01); *G06T 13/20* (2013.01); *G06T 17/05* (2013.01); *G08G 5/0013* (2013.01); *G08G 5/0052* (2013.01); *G08G 5/0069* (2013.01); *G08G 5/0086* (2013.01)

(56) References Cited

U.S. PATENT DOCUMENTS

| | | | |
|---|---|---|---|
| 2004/0066329 A1* | 4/2004 | Zeitfuss | G01S 5/0018 342/357.31 |
| 2005/0177307 A1 | 8/2005 | Greenfield et al. | |
| 2007/0078573 A1 | 4/2007 | Ivansson et al. | |
| 2009/0222149 A1 | 9/2009 | Murray et al. | |
| 2010/0073363 A1* | 3/2010 | Densham | G05B 17/02 345/419 |
| 2013/0253733 A1 | 9/2013 | Lee et al. | |
| 2014/0018979 A1 | 1/2014 | Goossen et al. | |
| 2014/0249693 A1 | 9/2014 | Stark et al. | |
| 2014/0253687 A1* | 9/2014 | Lee | G06F 3/0488 348/46 |
| 2014/0324253 A1 | 10/2014 | Duggan et al. | |
| 2016/0078770 A1* | 3/2016 | Coulmeau | G08G 5/0039 701/3 |
| 2016/0155260 A1* | 6/2016 | Jenkins | G06T 15/20 345/419 |
| 2016/0306351 A1 | 10/2016 | Fisher | |

OTHER PUBLICATIONS

Joubert et al., An Interactive Tool for Designing Quadrotor Camera Shots, ACM Transactions on Graphics (TOG)—Proceedings of ACM SIGGRAPH Asia 2015, vol. 34 Issue 6, Nov. 2015.
Meier et al., Pixhawk: A Micro Aerial Vehicle Design for Autonomous Flight using Onboard Computer Vision, Feb. 23, 2012.

* cited by examiner

INTERFACE FOR PLANNING FLIGHT PATH

CROSS REFERENCE TO OTHER APPLICATIONS

This application claims priority to U.S. Provisional Patent Application No. 62/200,128 entitled METHOD FOR MULTIDIMENSIONAL PATH AND PARAMETER GENERATION FOR USE IN AUTONOMOUS SYSTEMS filed Aug. 3, 2015 which is incorporated herein by reference for all purposes.

BACKGROUND OF THE INVENTION

Controlling a drone aircraft vehicle takes a considerable amount of skill. Traditionally, these vehicles have been controlled using a two stick controller that requires a pilot operator to provide precise commands via the controller at precise times during flight to fly the vehicle on the desired flight path. Unfortunately, vehicle crashes are common due to pilot error. Not only are these traditional controllers not intuitive for a novice pilot, timing precise movements requires quick reaction time and navigation skills that are often very difficult for an average pilot. In addition to controlling the vehicle's flight path, often the pilot must also control properties of a camera attached to the vehicle while the vehicle is in flight to capture a desired flight video footage. For example, the pilot must also control during the flight an orientation of a gimbal to orient an attached camera at a desired object to be captured in addition to controlling other camera parameters such as lens focal length. As additional time critical tasks are required of the pilot, it becomes even more difficult for a pilot to effectively control the vehicle and its camera parameters during flight to achieve a desired result. In some cases, multiple operators are needed to manage all of the variables needed to be controlled during flight. However, because the actions of the operators are dependent on each other, communication problems between the operators may lead to difficulty in achieving the desired result.

BRIEF DESCRIPTION OF THE DRAWINGS

Various embodiments of the invention are disclosed in the following detailed description and the accompanying drawings.

DETAILED DESCRIPTION

Figure 1:
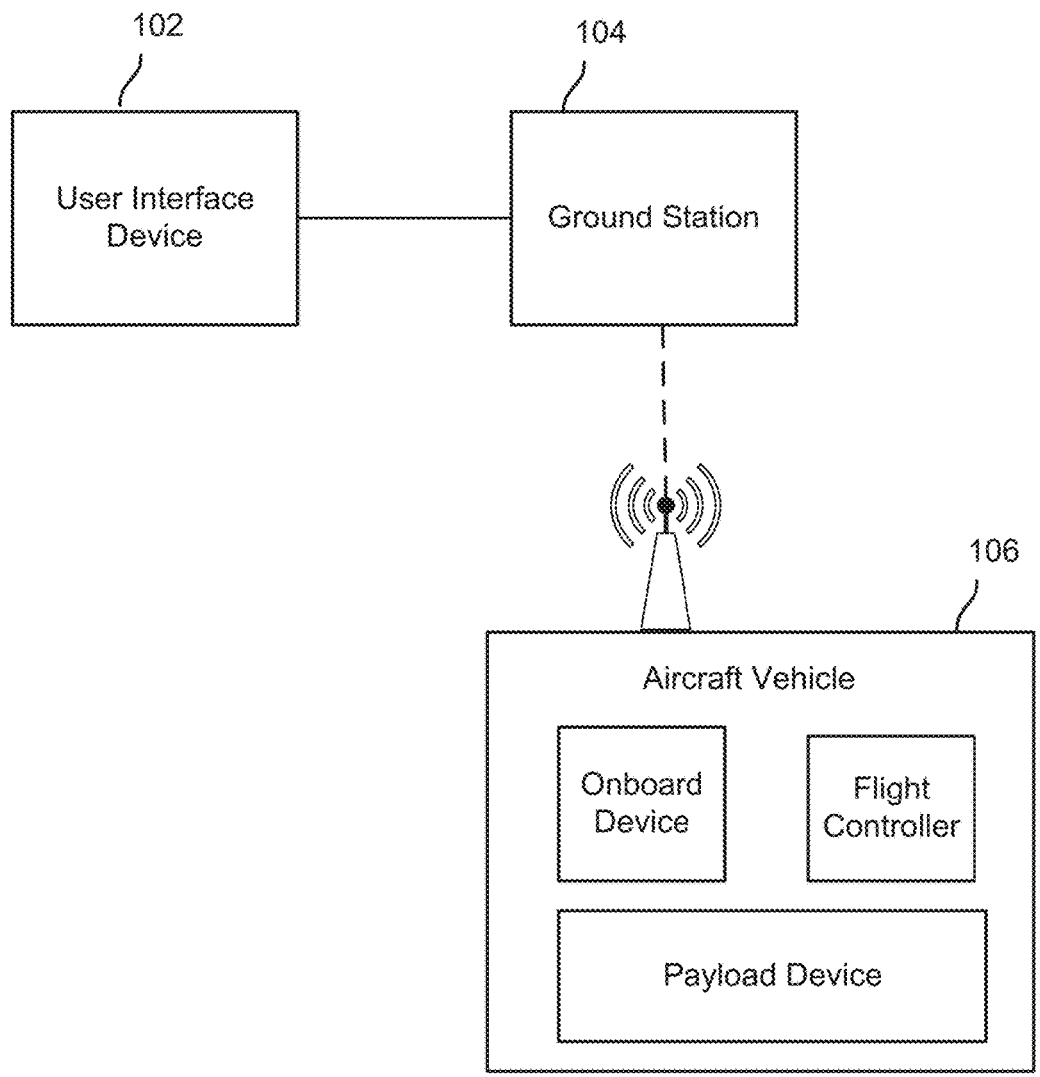
FIG. 1 is a block diagram illustrating an embodiment of a system for planning the operation of a vehicle.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Specifying a traversal path is disclosed. In some embodiments, a specification of a plurality of key locations within a virtual environment is received. For example, a route path of a flight vehicle is planned and refined within the virtual environment and the final planned path is physically executed later using the vehicle. The specified key locations may correspond to points in a flight path and the key locations are to be connected together to form a path. A trajectory between the key locations is determined. For example, a continuous path curve in space that passes through the key locations is calculated. This curve may be constrained by one or more constraints that limit a path and/or a propriety associated with the trajectory. A three-dimensional virtual preview of a traversal path on the trajectory is provided. For example, the trajectory is visually provided to a user to allow the user to verify a path of the trajectory and allow the user to adjust any aspect of the trajectory as desired. Commands are generated for a physical vehicle to at least in part follow the trajectory. For example, once the planned trajectory has been confirmed, instructions to physically execute the trajectory are generated and provided to the vehicle for execution.

An interface for planning a traversal path of a vehicle is also disclosed. In some embodiments, a virtual three-dimensional model of a physical operation environment is provided. For example, the virtual three-dimensional model of the physical operation environment is representative of a flight environment where an aircraft vehicle is to be flown and the virtual three-dimensional model is utilized to plan a flight route and on-board camera parameters of the aircraft vehicle prior to its flight and camera image capture. The virtual three-dimensional model may be provided to a user via a virtual reality headset to create an illusion that the user is placed in the virtual world of the virtual three-dimensional model.

A vehicle placement indicator is tracked within the virtual three-dimensional model of the flight environment. Tracking the vehicle placement indicator includes tracking a location and an orientation of the vehicle placement indicator within the virtual three-dimensional model. A traversal path and camera configuration are planned using the moveable placement indicator and the viewfinder display window within the virtual three-dimensional model. For example, a user navigates the vehicle placement indicator within the virtual three-dimensional model and places the vehicle placement indicator at a desired location and orientation to indicate a key/waypoint location (e.g., indicate a key frame location) in a flight path of an aircraft vehicle being planned. A viewfinder display window is provided within the virtual three-dimensional model that displays a simulated view from a camera mounted on a vehicle located at the location of the vehicle placement indicator and oriented at a direction of the orientation of the vehicle placement indicator. For example, by using the viewfinder window, the user is able to visualize the image that will be captured by the camera mounted on a vehicle located at the specified location coordinate and orientation of the placement indicator. In some embodiments, the key locations and orientations/parameters specified in the virtual three-dimensional model are translated into a plan that is provided to a vehicle to automatically control the vehicle to physically execute in the physical world the plan specified in the virtual model.

FIG. 1 is a block diagram illustrating an embodiment of a system for planning the operation of a vehicle. User interface system 102 is utilized by a user to plan a movement and payload control of vehicle 106. For example, the user utilizes user interface system 102 to plan a flight path and camera control of aircraft vehicle 106. In one example, user interface system 102 includes a virtual reality headset and one or more controllers and the headset and controllers are utilized to navigate and indicate a route path within a three-dimensional virtual model of a physical environment where the vehicle is to be operated. Examples of the user interface system include a virtual reality device, an augmented reality device, a headset, a mobile device, a tablet computer, a laptop computer, a desktop computer, a spatial tracking system, a controller, and any other computer or device that can be utilized to receive input from a user to interact within a virtual environment model to plan execution of the vehicle. In some embodiments, user interface system 102 includes a localization system to determine a location/orientation of a user and/or controller. For example, user interface system 102 includes one or more of the following types of localization systems: motion capture system, GPS, Real Time Kinematic (RTK GPS), electromagnetic tracking system, inertial, ultra-sonic system, ultra-wideband locating system, visual marker/marker-less tracking, visual odometry, GPS-Inertial Odometry, Visual-Inertial Odometry, Lidar system, iBeacon/Tag, Simultaneous localization and mapping and Wifi Localization.

Once execution plans are specified using interface system 102, specifications of the plan are provided to ground station 104. Examples of ground station 104 include a controller, a mobile device, a tablet computer, a laptop computer, a wearable computer, a desktop computer, and any other system that is able to provide data of the specification to aircraft vehicle 106. In some embodiments, the portable nature of ground station 104 allows a user to carry the ground station to the site of execution and utilize it to modify/adjust/tweak the plan. For example, adjustments to the received plan may be made using a display user interface of ground station 104. In some embodiments, user interface system 102 and ground station 104 are included in the same physical system.

Aircraft vehicle 106 receives specification of the execution plan from ground station 104 and is to be utilized to execute the plan. Aircraft vehicle 106 includes an onboard device that receives and executes the specification of the plan. For example, the onboard device includes a memory and a processor that coordinate and automatically execute the specification of the plan. In some embodiments, the specification of the plan is provided to aircraft vehicle 106 wirelessly. For example, a wireless connection is established between ground station 104 and aircraft vehicle 106 and data is transferred via the wireless connection. Aircraft vehicle 106 includes a flight controller and the flight controller controls motors of the aircraft vehicle to fly and navigate aircraft vehicle 106. The flight controller may utilize information from one or more sensors such as a gyroscope, a Global Positioning System, accelerometer, motion capture system, GPS, Real Time Kinematic (RTK GPS), electromagnetic tracking system, inertial, ultra-sonic system, ultra-wideband locating system, visual marker/marker-less tracking, visual odometry, GPS-Inertial Odometry, Visual-Inertial Odometry, Lidar system, iBeacon/Tag, Simultaneous localization and mapping and Wifi Localization, etc. to assist in stabilizing, orienting, and navigating the aircraft vehicle. The onboard device provides instructions to flight controller 106 to execute the received plan. In some embodiments, commands are received from a controller while aircraft vehicle 106 is executing the plan and one or more properties of the plan are dynamically adjusted based on the commands. For example, using a two-stick controller, a user provides commands to speed up or slow down a flight speed for aircraft vehicle 106 following a flight trajectory path specified by the plan.

Aircraft vehicle 106 includes a payload device and configuration/use of the payload device has also been configured using user interface system 102 and has been specified in the received plan. For example, the received plan specifies a vector of configuration states for the vehicle and its payload for each time period during the planned execution time. The payload device may include one or more of the following: a camera, a gimbal, a light source, a sensor, a content holder, a sprayer, a content spreader, a firework launcher/holder, or any other device able to be attached to vehicle 106. Examples of aircraft vehicle 106 include an Unmanned Aerial Vehicle, an airplane, a helicopter, and a multirotor drone. Although an example aircraft is shown in FIG. 1, other types of vehicles may be planned using interface system 102. For example, execution of a terrain vehicle, an aquatic vehicle, a hover vehicle, a robot, a robotic arm, an autonomous vehicle, or any other machine that can be programmed to move within an environment can be planned using a virtual environment model accessed using interface system 102. Although a single vehicle is shown in FIG. 1, in various embodiments, execution of multiple vehicles may be planned using user interface system 102. For example, a coordinate flight of a plurality of aircraft vehicles is planned using the same virtual environment model accessed using user interface system 102.

Figure 2:
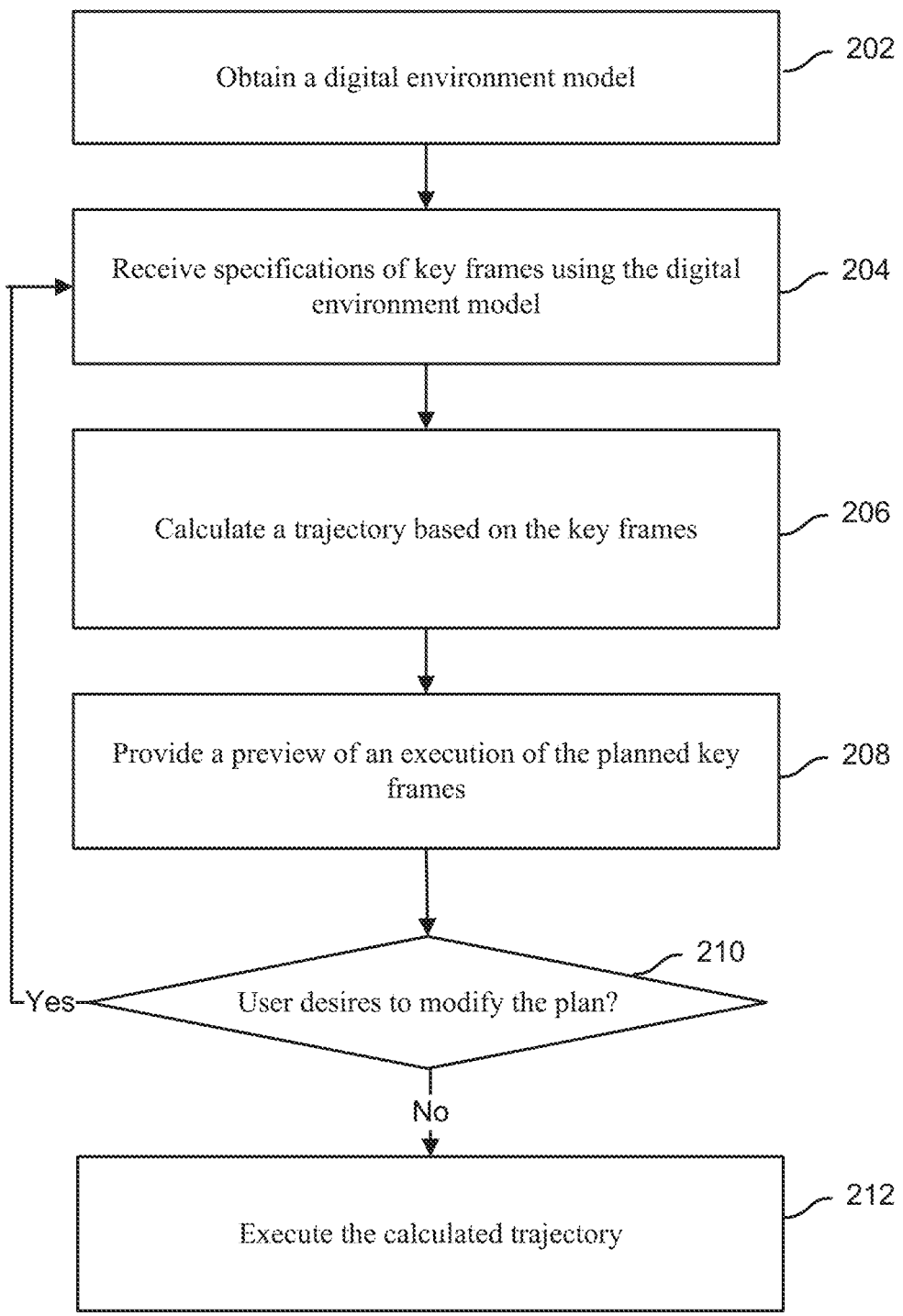
FIG. 2 is a flowchart illustrating an embodiment of a process for planning and executing planned movement of a vehicle.

FIG. 2 is a flowchart illustrating an embodiment of a process for planning and executing planned movement of a vehicle. For example, movement of an aircraft vehicle and configuration of its payload with respect to the planned movement are planned and executed using the process of FIG. 2. The process of FIG. 2 may be implemented on one or more components shown in FIG. 1. Examples of the vehicle include an aircraft vehicle, a terrain vehicle, an aquatic vehicle, a hover vehicle, a robot, a robotic arm, and an autonomous vehicle. In some embodiments, the process of FIG. 2 is utilized to plan a traversal path of the vehicle. In some embodiments, the process of FIG. 2 is utilized to plan camera footage capture using a camera mounted on the vehicle. In some embodiments, the process of FIG. 2 is utilized to plan a coordinated movement of one or more vehicles. For example, a coordinated flight plan of a plurality of aircraft vehicles that carry a light source payload is planned to create an entertainment performance (e.g., light painting performance). In some embodiments, the process of FIG. 2 is utilized to plan a firework display carried and launched by one or more vehicles.

At 202, a digital environment model is obtained. For example, a three-dimensional virtual model of a physical environment in which an aircraft vehicle is be operated is obtained. Examples of the digital environment model include a map, a three-dimensional map, a virtual reality environment model, an augmented reality model, an outdoor environment model, an indoor space model, a building model, and any other digital model of a space, site, area, or location where a vehicle is to be operated. In some embodiments, obtaining the virtual environment model includes obtaining an identification of an environment to be modeled. For example, an identification of a location, an area, a building, and/or a room where the vehicle is to be operated is received. In some embodiments, the digital environment model is obtained from an existing repository. For example, a three-dimensional model publically available from a map repository source (e.g., generated using satellite imagery, aerial photography, etc.) is obtained.

In some embodiments, obtaining the digital environment model includes generating the digital environment model. For example, a preexisting digital environment model for a specific location where the vehicle is to be operated is not available or inaccurate and the digital environment model is to be generated. Generating the digital environment model may include obtaining sensor data (e.g., camera images, ultrasound, GPS, etc.) of a specified location and using the sensor data to generate the digital environment model. For example, a user has specified a location (e.g., user outlines an area of a map) and an aircraft vehicle is automatically programmed (e.g., the same aircraft vehicle is first utilized to capture images of the environment for the model then is to be later utilized to execute a flight plan planned using the digital environment model) to fly around the specified location to capture aerial images that are utilized to generate the digital environment model. The images are then utilized to perform Structure from motion (SfM) processing to estimate three-dimensional structures from two-dimensional image sequences. In another example, an environment mapping device (e.g., mobile device with a stereoscopic camera, three-dimensional capture camera, etc.) is utilized to capture sensor data (e.g., images from one or more cameras, accelerometer data, gyroscope data, etc.) and the sensor data is utilized to generate the digital environment model.

At 204, specifications of key frames are received using the digital environment model. By specifying key frames, a user is able to plan a traversal route of the vehicle in a corresponding physical environment. For example, each key frame identifies an ordered key location/waypoint of the vehicle. In some embodiments, each key frame identifies a location within the digital environment model that corresponds to a physical location of the corresponding physical environment. The location may be a location coordinate of the digital environment model and/or a location coordinate of the physical environment (e.g., latitude/longitude coordinates and altitude). In some embodiments, each key frame identifies one or more configuration settings of a payload of the vehicle/robot at the location of the key frame. For example, a camera/gimbal setting at the location of the key frame is identified in the key frame. Thus, rather than tediously specifying every location and payload setting of a planned operation execution of the vehicle and its payload, only key points along the planned operation are specified as key frames and the settings between the key frames are automatically generated to smoothly transition between the key frames.

In some embodiments, each key frame is associated with a specific set of parameters for the vehicle and its payload (e.g., camera/gimbal) at a particular location and/or time during planned execution. These parameters provide a snapshot of the desired state that is to be implemented and by transitioning between each set of parameters for an ordered list of key frames, an execution plan has been generated. Examples of the parameters specified for a key frame include one or more of the following: a position of the vehicle, an orientation of the vehicle, an orientation of a gimbal, camera parameters (e.g., exposure time, aperture, focal length, focus setting, ISO, etc.), visual filter, visual effect, identification of an object to be tracked and placed in camera view, a payload light source setting, a firework launcher setting, and any other parameter/setting of the vehicle and its payload.

In some embodiments, a user specifies the key frame by navigating a virtual world of the virtual environment model (e.g., using a virtual reality headset, three-dimensional graphical rendering engine, etc.) and placing a marker within the virtual world of the virtual environment model that corresponds to a location of the key frame. For example, a user is placed in a virtual world of the virtual environment model using the virtual reality headset and the user is able to look and move around in the virtual world to find a location within the virtual environment model that the user would like to add to a planned traversal trajectory of the vehicle by placing a key frame. In this example, the user may also specify a camera/gimbal angle at the key frame location as well as specify other camera/gimbal parameters for the key frame. By using the virtual environment model, the user is able to plan movement and configuration of the vehicle and its payload in the safe and forgiving environment of the virtual environment model prior to executing the plan in the corresponding physical environment.

In some embodiments, the user specifies the key frame by indicating a location on a map of the physical operating environment of the vehicle. In some embodiments, augment reality is utilized to allow a user to specify the key frame by selecting a location on a virtual model of the physical operating environment rendered virtually over a surface of the physical world of the user. In some embodiments, multiple different types of user interfaces may be utilized to plan a traversal path. For example, a key frame specified using a virtual reality headset or augmented reality headset/tablet may be modified using a plugin to three-dimensional animation software.

In an alternative embodiment, rather than using the virtual environment model, key frames are specified by physically placing the vehicle at the desired location and orientation with the desired setting in the physical operating environment. For example, because smoothly navigating the vehicle in real time in a desired traversal path with desired payload settings is difficult, the user instead navigates the vehicle to key locations and adjusts orientation and payload settings as desired. Once a desired state of the vehicle and its payload has been achieved, the user captures the current state as a key frame and the vehicle and its payload may be adjusted to new positions/configurations to set for a next key frame.

At 206, a trajectory is calculated based on the key frames. For example, the key frames specify the state of the vehicle and its payload only at specific locations and/or times in execution and the trajectory is calculated to determine the intermediary states of the vehicle and its payload between the key frames to define a smooth continuous trajectory through the ordered list of key frames. In some embodiments, a time-based function that connects the parameters of the key frames is calculated. This may include calculating intermediary positions/configurations/settings between parameters of the key frames as a function of time. In some embodiments, calculating the trajectory includes determining a function and/or a set of parameters defining a state of the vehicle/payload for each time period during execution of the plan.

In some embodiments, a traversal path between the locations of the key frames is calculated. The trajectory may take into account constraints of the corresponding physical environment (e.g., obstacles in the environment) and provide a smooth transition path (e.g., flight path) connecting the locations of the key frames. In some embodiments, the traversal path includes one or more smoothed curved path lines connecting the locations of two key frames. In some embodiments, the traversal path includes one or more straight direct path lines connection the locations of two key frames. For example, a user is able specify whether a curved path line or a straight direct path line should connect each path segment between two key frames. In some embodiments, a speed of travel of the vehicle along the traversal trajectory path is set to be a preset constant. In some embodiments, the speed of traversal may be modified for any segment of the traversal trajectory path. For example, if the vehicle is to move at a constant speed, the relative distance between key frames along the calculated traversal trajectory path corresponds to the relative time between the key frames. In some embodiments, a visual timeline labeling a time when each key frame is reached during execution is provided and the user is able to adjust the speed and relative time between key frames by adjusting the relative location of key frame labels in the visual timeline.

In some embodiments, a trajectory between one or more payload configurations of the key frames is also calculated. For example, a transition between different specified gimbal orientations of two consecutive key frames is calculated. In some embodiments, the trajectory is visually displayed in a virtual world of the virtual environment model. For example, a line connecting key frame locations in the virtual environment model is visually provided.

At 208, a preview of an execution of the planned key frames is provided. For example, a visual representation of the vehicle traveling between visually indicated key frames along a visual plotted trajectory path line is animated in the virtual world of the virtual environment model. In some embodiments, the preview provides a simulated display of a result of payload configuration settings as the vehicle is operated according to the planned trajectory. For example, a display window provides a simulated view of images/video captured by a camera mounted on the vehicle as the vehicle travels on the trajectory with corresponding camera/gimbal configurations along the trajectory. By being able to view and simulate the image/video that will be captured by a payload camera, a user is able to better plan the exact camera footage desired by the user.

At 210, it is determined whether a user desires to modify the plan. For example, based on the preview, the user may be satisfied with the simulated result. If the user is not satisfied with a result of the preview, the user is able to modify one or more aspects of the key frames. If at 210 it is determined that the user desires to modify the plan, the process returns to 204 where the user is able to adjust key frames of the execution plan (e.g., change, add, delete key frame(s)).

If at 210 it is determined that the user does not desire to modify the plan, at 212, the calculated trajectory is executed. For example, implementation data of the trajectory plan (e.g., flight plan) is rendered, packaged, and provided to a ground station for execution via the vehicle robot. The provided implementation data may be further modified/edited (e.g., on location tweaks) using the ground station to implement final adjustments prior to start of execution. In some embodiments, executing the plan includes providing instructions to the vehicle (e.g., to an onboard device/computer) to implement the trajectory plan. For example, navigation instructions and payload configurations are provided to automatically navigate the vehicle along a planned route with corresponding planned payload configurations. During execution of the planned trajectory, one or more aspects of the trajectory may be dynamically modified. For example, a speed of execution/movement may be dynamically modified during execution.

Figure 3:
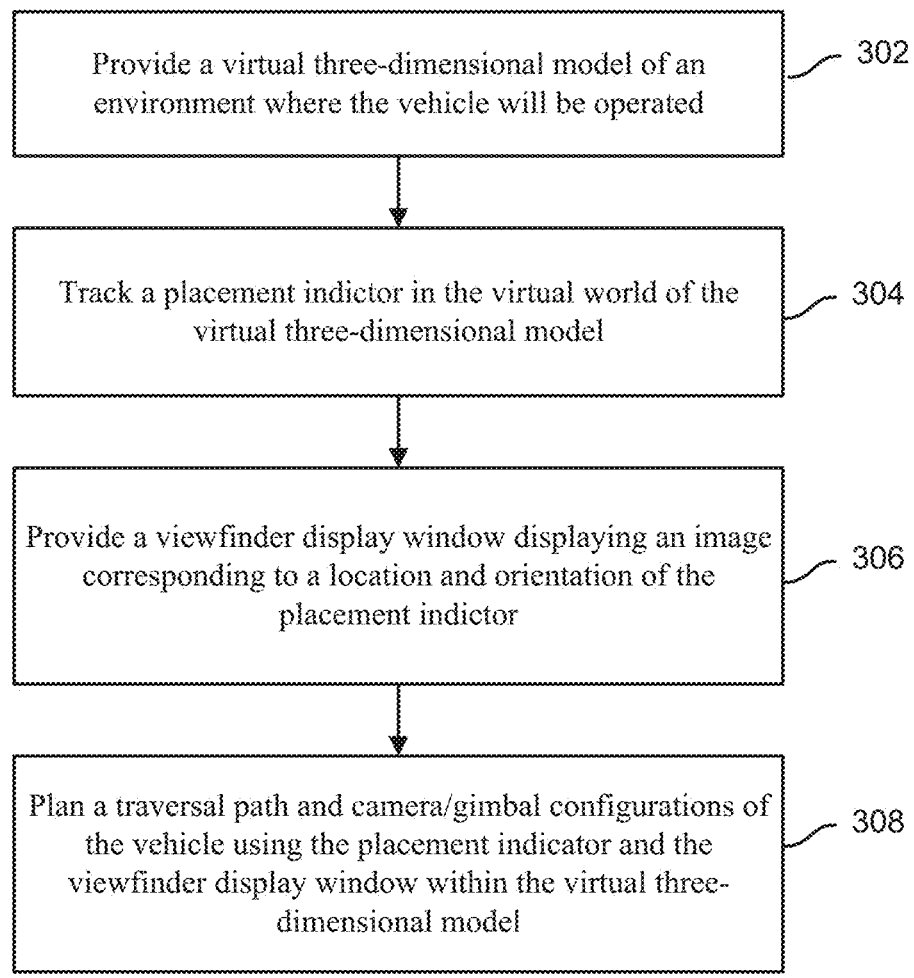
FIG. 3 is a flowchart illustrating an embodiment of a process for planning operation of a vehicle.

FIG. 3 is a flowchart illustrating an embodiment of a process for planning operation of a vehicle. The process of FIG. 3 may be implemented on user interface device 102 and/or ground station 104 of FIG. 1. In some embodiments, the process of FIG. 3 is included in 204 of FIG. 2.

At 302, a virtual three-dimensional model of an environment where the vehicle will be operated is provided. In some embodiments, providing the three-dimensional model includes providing a visual display of the virtual model received in 202 of FIG. 2. In some embodiments, the virtual three-dimensional model is navigable to place and immerse a user within the virtual world of the model depicting the environment where the vehicle will be operated. For example, the user may look around and travel within the virtual three-dimensional model. The virtual three-dimensional model may include rendered three-dimensional visual objects that have been shaped and textured based on their corresponding real physical counterpart in the physical environment. In some embodiments, the virtual three-dimensional model is provided via a display monitor and the user may interact with the displayed virtual three-dimensional model using a keyboard, a mouse, a joystick, a controller, and any other user input device. In some embodiments, the virtual three-dimensional model is provided via an application and/or web interface. In some embodiments, the virtual three-dimensional model is provided via a plugin to an animation and/or modeling software. For example, the virtual three-dimensional model is loaded into a 3D animation modeling software and a plugin allows a user to interact with the virtual three-dimensional model via the software to plan a traversal path of the vehicle.

In some embodiments, a first person view of the virtual three-dimensional model is provided via a virtual reality display headset. For example, the headset displays a different offset image to each eye of a user to provide an illusion of three-dimensionality. An orientation and placement of the headset may be tracked using one or more location systems and sensors (e.g., image tracking using cameras) and the movement of the headset is translated to movement within the virtual three-dimensional model to allow the user to explore and navigate the virtual three-dimensional model. By using the virtual reality display headset, the user is provided a more immersive experience of being placed within the virtual environment as compared to providing a 3D rendering on a flat display screen.

In some embodiments, the virtual three-dimensional model is provided via an augmented reality display. For example, a substantially transparent display worn by a user allows virtual objects to be displayed over a physical environment to create an appearance that the virtual object exists in the physical environment. In one example, a small scale model of the virtual three-dimensional model is displayed on a table, a floor, or another flat surface of a physical environment of the user to create an illusion that the user is standing over the world of the virtual three-dimensional model. By tracking movement of augmented reality display glasses and/or the user, the rendered image on the glasses can be appropriately updated to maintain the illusion of the scaled virtual three-dimensional model placed in the physical environment and viewed from a different angle/location.

In some embodiments, environmental conditions are able to be specified to match the likely environmental conditions during execution. For example, desired weather, time of day, and lighting conditions (e.g., based on specific date and time) are specified and the specified environmental conditions are simulated in the virtual world of the virtual three-dimensional model. In some embodiments, a generated preview of simulated images/video captured by a payload camera (e.g., preview provided in 208 of FIG. 2) reflects the simulated environmental conditions.

At 304, a placement indictor is tracked in the virtual world of the virtual three-dimensional model. For example, a user is provided a visual representation of the vehicle as a part of the placement indicator and the user is able to move the placement indicator in the virtual environment model. Tracking the moveable placement indicator includes tracking a location coordinate of the moveable placement indicator within the virtual 3D model and an orientation of the placement indicator. When the placement indicator is at a desired position, a user may indicate that the current position of the placement indicator corresponds to a new key frame.

In some embodiments, a user moves the placement indicator within the virtual environment using one or more user input devices (e.g., keyboard/mouse). In some embodiments, a user moves the placement indicator within the virtual environment using one or more controllers. For example, a location and orientation of a controller is tracked using sensors and translated to movement of the placement indicator in the virtual environment. In the example of a virtual reality display headset, a visual presence of one or more controllers is provided in the rendered environment and the placement indicator is the representation of the controller in the virtual environment. In one example, a user holds a separate controller in each hand of the user and hand presence of the user in the virtual reality environment is provided as a visual representation of the controllers in the virtual reality environment. As the user moves each hand holding the controller, movement and orientation of the controllers are tracked and a corresponding visual representation of the controllers is placed in the virtual reality environment for display. In some embodiments, the placement indictor is shaped as a visual representation of the vehicle. In some embodiments, the placement indictor is visually represented as a cursor.

In some embodiments, the placement indictor includes one or more body parts of a user. For example in an augmented reality environment, a user is able to interact with virtual objects and indicate key frame locations using body parts of the user (e.g., finger, hands, etc.). In one example, a user makes a gesture using hands of the user (e.g., makes a square shape with fingers by connecting each thumb of one hand to each index finger of the other hand) and the location and orientation of the gesture is the placement indicator to be tracked. In various embodiments, the placement indictor is tracked using localization systems and/or sensors (e.g., accelerometers, gyroscopes, cameras, etc.) and/or inputs from one or more user interface devices.

At 306, a viewfinder display window displaying an image corresponding to a location and orientation of the placement indictor is provided. For example, an image that would be captured by a camera/gimbal mounted on the vehicle at a location and orientation of the placement indictor is provided in the viewfinder display window. This enables a user to preview a footage that would be captured by the camera. In some embodiments, the image displayed by the viewfinder display window has been configured for a specific camera/gimbal being emulated and the viewfinder display window displays a portion of the virtual environment that corresponds to an image that would be captured by the specific camera with specified configuration settings at the location and orientation of the placement indictor. In some embodiments, by adjusting an orientation of the placement indictor (e.g., adjust orientation of a controller), a desired orientation of the camera/gimbal can be specified and a preview of an image that would be captured with the specified orientation is provided in the viewfinder display window. Camera configurations such as ISO, resolution, compressing setting, focal length, aperture, filter, focus setting, white balance, etc. may be specified by a user and the image displayed on the viewfinder display window provides a simulated image captured using the specified camera configurations.

In some embodiments, the viewfinder display window is visually coupled to the placement indictor. For example, the display window is a part of a visual display object corresponding to the placement indictor. In the example of virtual reality, it appears to a user that the user is holding a controller with an attached viewfinder display window. In the example of augment reality, the viewfinder display window may be placed within a regular area defined by finger gestures of the user.

At 308, a traversal path and camera/gimbal configurations of the vehicle is planned using the placement indicator and the viewfinder display window within the virtual three-dimensional model. For example, the placement indicator is moved within the virtual three-dimensional model until a desired location and orientation is indicated by the placement indicator. The user may indicate to place a key frame at the current location and orientation of the placement indicator to set the location and orientation as parameters of the placed key frame. For example, a user presses a button on the controller to indicate that a current location and orientation of the placement indicator corresponds to a new key frame. The image displayed on the viewfinder display window also confirms the image that would be captured by a camera of the vehicle at the indicated location and orientation. The user may also adjust and specify other parameters of the camera/gimbal associated with the key frame using menus and/or other interfaces associated with the key frame.

In some embodiments, once a key frame has been indicated, a visual object corresponding to the key frame remains in the virtual model to indicate the location of the indicated key frame. This visual indication of the key frame may also include a copy of the image of the viewfinder display window for the specific location, orientation, and other configurations of the key frame. Each successive key frame may be indicated using the moveable placement indicator and the viewfinder display window. The key frames are ordered and the ordering of key frames in traversal order may correspond to the order in which the key frames have been indicated. A user may delete or modify an indicated key frame or add a new key frame before/after/between any existing key frame(s). In some embodiments, a user may modify a key frame by selecting an existing key frame and indicating that a new modified position/orientation of the placement indicator should replace the indicated existing key frame. For example, when the placement indicator is within a threshold distance from an existing key frame (e.g., visual indication is provided that the placement indicator is within the threshold distance), the user may press a button on a controller to "grab" the visual representation of the existing key frame and the visual representation of the existing key frame snaps to the placement indicator and moves with the placement indicator. The user may then move the placement indicator to a new location/orientation and indicate (e.g., release button) that the new location/orientation is to become the location/orientation of the modified key frame. The user may also adjust and specify other parameters of the camera/payload associated with the key frame using menus and/or other interfaces associated with the key frame.

In some embodiments, any payload/camera parameters of any indicated key frame may be modified by selecting the key frame and indicating the changes. Certain parameters may default to a default setting unless specifically indicated or modified. In some embodiments, a trajectory between locations of the key frames is calculated and visually indicated with a plotted line in the virtual model tracing the traversal path between the locations of the key frames. During a preview of images/videos captured during a planned traversal, a representation of the vehicle following the travel path line is provided to indicate the location of the vehicle corresponding to a current image of the preview.

In some embodiments, a visual guidance on an orientation of the placement indicator is provided by projecting a surface indicator (e.g., red circle) on a surface of an object in the virtual model that is aimed at by the orientation of the placement indicator. For example, if the placement indicator is oriented towards a tree object in the virtual environment, a red dot is shown on the tree object to indicate the center of the aim. This may be analogous to having a laser pointer mounted on the placement indicator and the illumination of the laser pointer points to a center of a camera aim of the placement indicator shown. In some embodiments, a second controller is utilized by a user and the second controller is visually represented in the virtual world of a virtual model. This second controller may be utilized to navigate within the virtual world. For example, a user may perform gestures using one or more controllers to move towards or away from a headed direction. In some embodiments, the visual representation of the second controller projects a pointer that illuminates a surface of an object in the virtual model and a user may teleport to the location of the illumination when indicated (e.g., button press of the second controller).

In some embodiments, in addition to a visually plotted traversal trajectory path line of the vehicle, a look-at line (e.g., camera look-at line) is also visually indicated in the virtual environment model to plot a trace of the direction and aim of a camera of the vehicle/robot. When any key frame is modified, added, or deleted, the corresponding changes to the trajectory line and the look-at line are reflected.

In some embodiments, a key frame is associated with an expected reference location of a tracked object. For example, rather than requiring the vehicle to simply follow a trajectory path at a fixed rate in a single direction, when a location tracked object (e.g., human target subject to be filmed is tracked using a GPS device worn by the target subject) is detected to be located at/near the expected reference location specified for a key frame, the vehicle is to be moved along its trajectory path line to the vehicle location specified for this key frame. This may be useful when the vehicle is to be utilized to film the tracked object and the exact timing of movement of the tracked object is unknown. Even beyond the filming example, this also may be useful when the movement of the vehicle is to be synchronized with the tracked object.

In some embodiments, when a user specifies a key frame, the user specifies an expected reference location where a tracked object is expected to be located when the vehicle is located at the specified vehicle location of the key frame. In some embodiments, the expected reference location is a part of a reference rail path that specifies an expected traversal path of a tracked object. In some embodiments, the reference rail path may be specified by drawing the reference rail in three-dimensional space within the virtual world of the virtual model. In some embodiments, the reference rail path may be specified by indicating reference location points along with corresponding vehicle locations when specifying key frames and the reference rail path is generated by connecting the reference location points (e.g., calculate a smooth reference rail trajectory between the reference locations points) in the order of the corresponding key frames. In some embodiments, location points along the reference rail path are mapped to corresponding location points on the trajectory path of the vehicle. For example, for two adjacent key frames that each specify a vehicle location coordinate and a corresponding an expected reference location coordinate of a tracked object, the location points between the vehicle location coordinates of the two adjacent key frames along the calculated trajectory path of the vehicle is mapped (e.g., using a mapping function) to the location points between the expected reference location coordinates of the two adjacent key frames along the reference rail path (e.g., based on relative distance percentage along the corresponding calculated trajectory path or reference rail path). A detected distance of movement of the tracked object along the reference rail path is translated to an amount that the vehicle is to move along its trajectory path (e.g., when the tracked object moves a certain percentage of distance between expected reference locations of adjacent key frames on the reference rail, the vehicle is moved along the trajectory path by a distance that corresponds to the same certain percentage of distance between specified vehicle locations of the adjacent key frames). This may allow the vehicle to move back and forth along its trajectory path in synchronization with changes in the detected location of the tracked object along the reference rail path.

The tracked object may be tracked using image recognition and/or via location tracking of a device coupled to the tracked object (e.g., GPS device attached to the tracked object). For example, the vehicle, a controller and/or another device in communication with the vehicle receives tracking information of the tracked object. In some embodiments, because the expected reference locations and/or the reference rail path are expected locations, the tracked object may not move exactly to the expected location point or move exactly along the reference rail location during execution. In some embodiments, during execution, the detected location of the tracked object is mapped to a closest expected reference location and/or a closest location on the reference rail path to allow the vehicle to move to the location on its trajectory path that corresponds to this closest expected reference location and/or closest location on the reference rail path.

Identification of the target subject as well as where to relatively place the subject in a visual frame of a camera may be specified along with the reference location/rail and/or associated key frames as parameters. In some embodiments, the camera is allowed to dynamically adjust an orientation of the camera/gimbal to maintain the target subject in the camera shot as specified. In some embodiments, one or more limitations may be specified for tracking the target subject. For example, any of an amount of time, an amount of distance, a distance range, an orientation range, reference rail range, etc. are specified as one or more limits on tracking/following the target subject along the reference rail.

In some embodiments, a key frame is associated with a triggering condition. For example, rather than requiring the vehicle to follow a trajectory path at a constant speed in a single direction along the trajectory path, the vehicle movement or any payload parameter/configuration may be conditionally controlled dynamically during execution based on a triggering condition. For example, a user is able to specify for a key frame one or more triggering conditions and corresponding action to be performed upon detecting corresponding triggering condition. In one example, when the vehicle reaches a specified vehicle location of a key frame along its trajectory path, the vehicle stops it traversal and only resumes its movement along the trajectory path when a triggering user indication is provided. Example of the triggering condition include a user indication (e.g., button press on controller), a detected action (e.g., trigger action detected using sensor/image recognition), a detected location trigger (e.g., location tracking data), and any other received or detected event or trigger. Examples of the corresponding action for a triggering condition include a start of traversal, a stop of traversal, a direction change, a speed change, an acceleration change, a payload configuration/parameter change, any other change in a parameter, configuration or setting of the vehicle or its payload.

In some embodiments, a preview window is provided in the virtual world of the virtual model. For example, simulated images/video captured by a camera of the vehicle as the vehicle traverses the planned trajectory of the key frames is shown on a screen placed within the virtual world. By being able to view and simulate the image/video that will be captured by the payload camera, a user is able to better plan the exact camera shot desired by the user. The user may adjust the key frames to adjust the images/videos that will be captured and an updated preview is provided via the preview window.

Figure 4A:
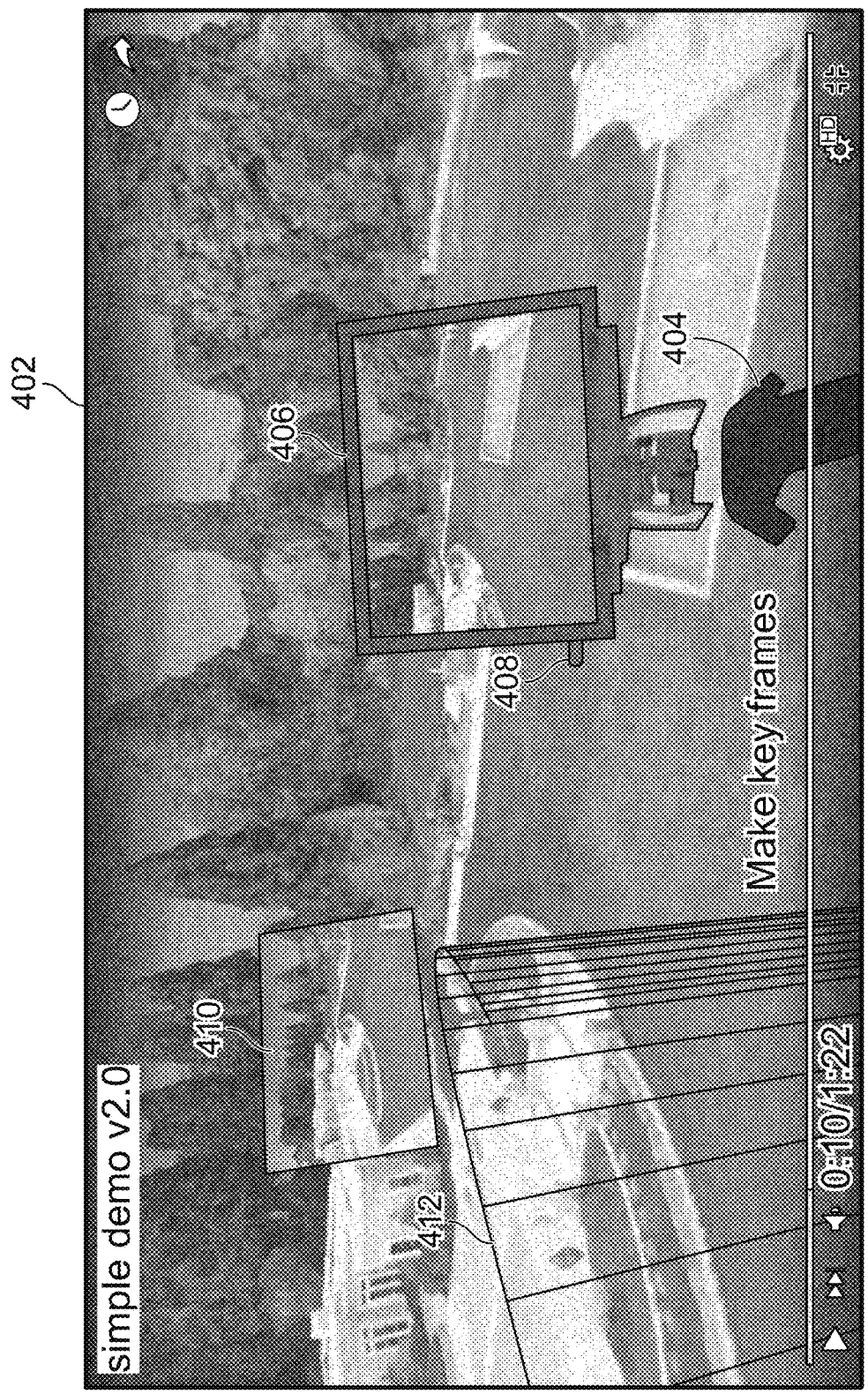
FIG. 4A is a screenshot illustrating an example of an interface for specifying a key frame.

FIG. 4A is a screenshot illustrating an example of an interface for specifying a key frame. In some embodiments, the screenshot of FIG. 4A illustrates the interface utilized for at least a portion of the process of FIG. 3. Screenshot 402 shows a rendered virtual world of a virtual three-dimensional environment model. The three-dimensional outdoor environment shown in screenshot 402 has been generated in 202 of FIG. 2.

Screenshot 402 is from a virtual reality interface as viewed via a virtual reality headset. Controller 404 is shown in the virtual world and is controlled by moving a corresponding physical controller in the physical world. In some embodiments, controller 404 represents the placement indicator in 304 of FIG. 3. A visual representation of a vehicle is also coupled to the visual representation of controller 404 to indicate that a flight path of the aircraft is being planned using controller 404. Viewfinder window 406 shows an image that would be captured by a camera mounted on the vehicle at a location of the shown vehicle representation. As controller 404 is moved around in the virtual world, the viewfinder window 406 is visually coupled to controller 404 and the image shown in viewfinder window 406 is updated to reflect the image that would be captured at the current location and orientation of controller 404. In some embodiments, viewfinder window 406 is the viewfinder display window of 306 of FIG. 3. Projection indicator circle 408 indicates a center of where a camera of viewfinder window 406 is being aimed. The circle 408 being projected on the surface of an object in the virtual environment model is updated correspondingly as a location and/or orientation of controller 404 is changed.

As a physical controller corresponding to controller 404 is moved and oriented in physical space, the visual representation of controller 404 is correspondingly moved in the virtual world space. When the virtual representation of the aircraft vehicle is at a desired location and pointed towards a desired camera image subject to be captured (e.g., confirmed in viewfinder window 406), a user may indicate (e.g., button press on physical controller) to set the current location and orientation of controller 404 in virtual space as parameters of a new key frame. Key frame representation 410 shows a key frame that had been previously created. This key frame is visually represented with the corresponding image from the viewfinder window (e.g., image from the viewfinder window when the key frame was created). Trajectory path line 412 shows a planned traversal trajectory connecting indicated key frames in order. This trajectory path has been automatically calculated to connect the key frames in a continuous path to form a smooth transition between states/parameters of the key frames in traversal order.

Figure 4B:
FIG. 4B is a screenshot illustrating an example of an interface for modifying a key frame.

FIG. 4B is a screenshot illustrating an example of an interface for modifying a key frame. Screenshot 420 shows key frame representation 410 being selected to modify its corresponding key frame. For example, when controller 404 is placed within a threshold distance to key frame representation 410 and a controller button is pressed, key frame representation 410 is visually snapped to controller 404 (e.g., viewfinder window 406 is replaced with key frame representation 410 that snaps into place of viewfinder window 406) and visually highlighted to indicate that the key frame has been selected for modification. Once the key frame has been selected, the corresponding physical controller may be moved and oriented to modify the location and orientation of the selected key frame. When the key frame is modified, its corresponding key frame visual indicator and trajectory path are appropriately updated. Screenshot 420 shows look-at path 414 of trajectory path line 412. Look-at path 414 traces the direction and aim of a camera of the vehicle on trajectory path line 412.

Figure 4C:
FIG. 4C is a screenshot illustrating an example of an interface for previewing images/videos that would be captured from a planned trajectory.

FIG. 4C is a screenshot illustrating an example of an interface for previewing images/videos that would be captured from a planned trajectory. Screenshot 430 shows preview screen 432 shown in the sky of the rendered virtual world of the virtual three-dimensional environment model of FIGS. 4A and 4B. By providing preview screen 432, a user is able to preview the camera footage to be captured on the planned trajectory path and make any adjustments as desired. As a preview is being shown in screen 432, virtual representation 434 of the vehicle moving along trajectory path line 412 is shown in the virtual world to indicate the location position of the vehicle that corresponds to the preview image shown on screen 432.

Figure 5:
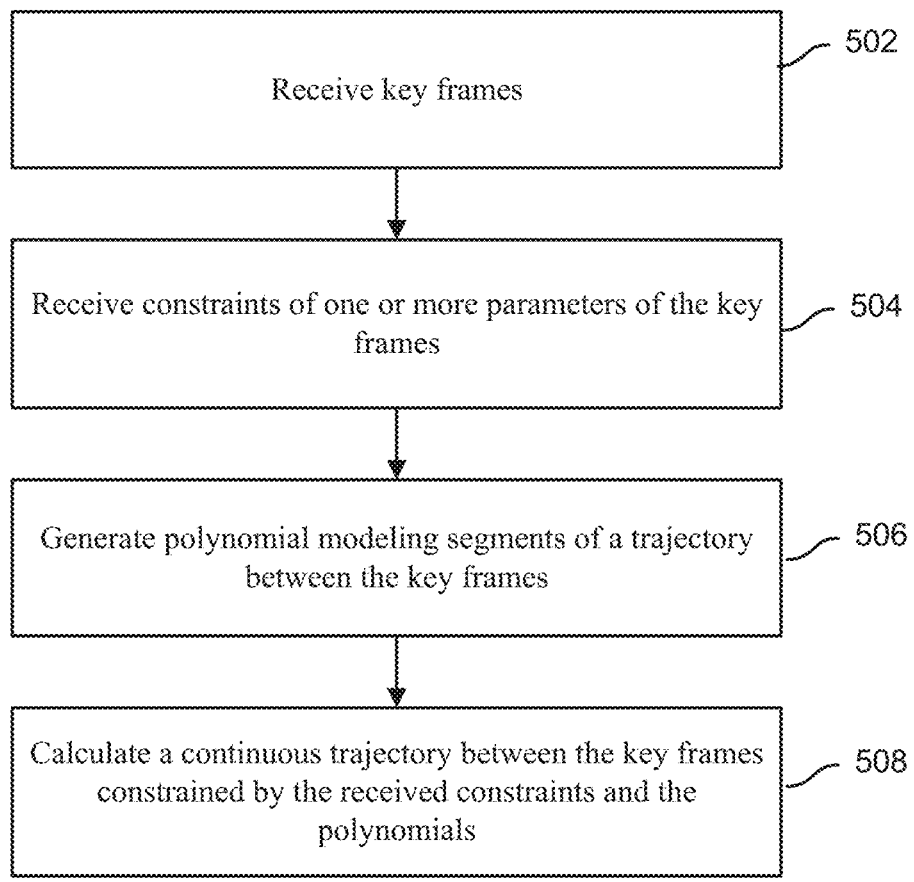
FIG. 5 is a flowchart illustrating an embodiment of a process of calculating a trajectory connecting key frames.

FIG. 5 is a flowchart illustrating an embodiment of a process of calculating a trajectory connecting key frames. The process of FIG. 5 may be implemented on user interface device 102 and/or ground station 104 of FIG. 1. In some embodiments, the process of FIG. 5 is included in 206 of FIG. 2. In some embodiments, the process of FIG. 5 is utilized in part to calculate the trajectory shown in FIGS. 4A-4C. In some embodiments, the trajectory identifies a continuous set of parameters between parameters of key frames such that a continuous transition is provided between the key frames. In some embodiments, the determining the trajectory includes determining a set of state/parameter vectors for each time period during execution. For example, although the state vectors corresponding to the key frames have been specified, the intermediate state vectors are calculated as the trajectory is calculated.

At 502, key frames are received. In some embodiments, the received key frames are key frames specified in 204 of FIG. 2 and/or 308 of FIG. 3. In some embodiments, each received key frame is a vector of parameter values of the key frames. Examples of the parameter values include values for one or more of the following: a position of the vehicle, an orientation of the vehicle, an orientation of a gimbal, camera parameters (e.g., exposure time, aperture, focal length, focus setting, ISO, etc.), visual filter, visual effect, identification of an object to be tracked and placed in camera view, an expected reference location of a tracked object corresponding the key frame, a triggering condition, an associated action to be performed when a triggering condition is detected, a payload light source setting, a firework launcher setting, and any other parameter/setting of the vehicle and its payload.

At 504, constraints of one or more parameters of the key frames are received. For example, the parameters of the key frames are associated with constraint limits and the constraint limits are to be utilized to constrain the trajectory to fit within the constraints. In some embodiments, at least one of the constraints identifies a physical location limitation of the operation environment. For example, information on obstacles, buildings, restricted flight zones, layout, etc. is provided to allow the trajectory to avoid restricted locations. In some embodiments, at least one of the constraints identifies performance specifications/limitations of the vehicle/robot to be utilized for execution. For example, motor type/performance, number of motors, weight, flight time, battery size, max/min speed/acceleration, flight controller performance, sensor availability/performance, and any other performance specifications/limitations of a vehicle are received. In some embodiments, at least one of the constraints identifies specifications/limitations of a payload of the vehicle to be utilized for execution. For example, specifications and performance limitations on a gimbal, a camera, a camera lens, etc. are received. In some embodiments, at least one of the constraints identifies environmental parameters. For example, specifications of time, temperature, humidity, wind, weather, etc. are received.

At 506, polynomial modeling segments of a trajectory between the key frames are generated. For example, each trajectory segment for each parameter of the key frames is modeled using a selected polynomial for the segment and parameter. By modeling the transition between key frame parameters as segments of polynomials, the overall trajectory may be determined by connecting the polynomials together. In some embodiments, the complexity (e.g., degree) of the polynomial may be dynamically adjusted based on processing power available to solve the polynomials. For example, although more complex polynomials may result in a higher performance trajectory, less complex polynomials may be utilized if processing power required to solve the polynomials is not available.

At 508, a continuous trajectory between the key frames constrained by the received constraints and the polynomials is calculated. For example, the received constraints limit the possible parameter/state value and/or rate of change of the parameter/state value and the trajectory is calculated to be limited by these constraints. In some embodiments, calculating the continuous trajectory includes calculating values of the polynomials that allow all of the polynomials of the same parameter to be connected. In some embodiments, calculating the continuous trajectory includes calculating values of the polynomials that satisfy one or more limits of the received constraints. For example, for a location of the vehicle, the location is constrained by locations of obstacles/area to be avoided. In another example, the first derivative of a trajectory parameter polynomial is limited by a maximum vehicle speed that depends on motor specification, flight controller specification, maximum wind speed, humidity, etc. In another example, the second derivative of a trajectory parameter polynomial is limited by the maximum acceleration limit that depends on motor specification, flight controller specification, etc. In another example, a third derivative of a trajectory parameter polynomial is limited by maximum jerk. In some embodiments, calculating the continuous trajectory includes determining a vector of states of the vehicle/payload as a continuous function of execution time. In various embodiments, the continuous trajectory includes one or more smoothed curved path lines and/or one or more straight path lines between the key frames, as indicated by a user.

Figure 6:
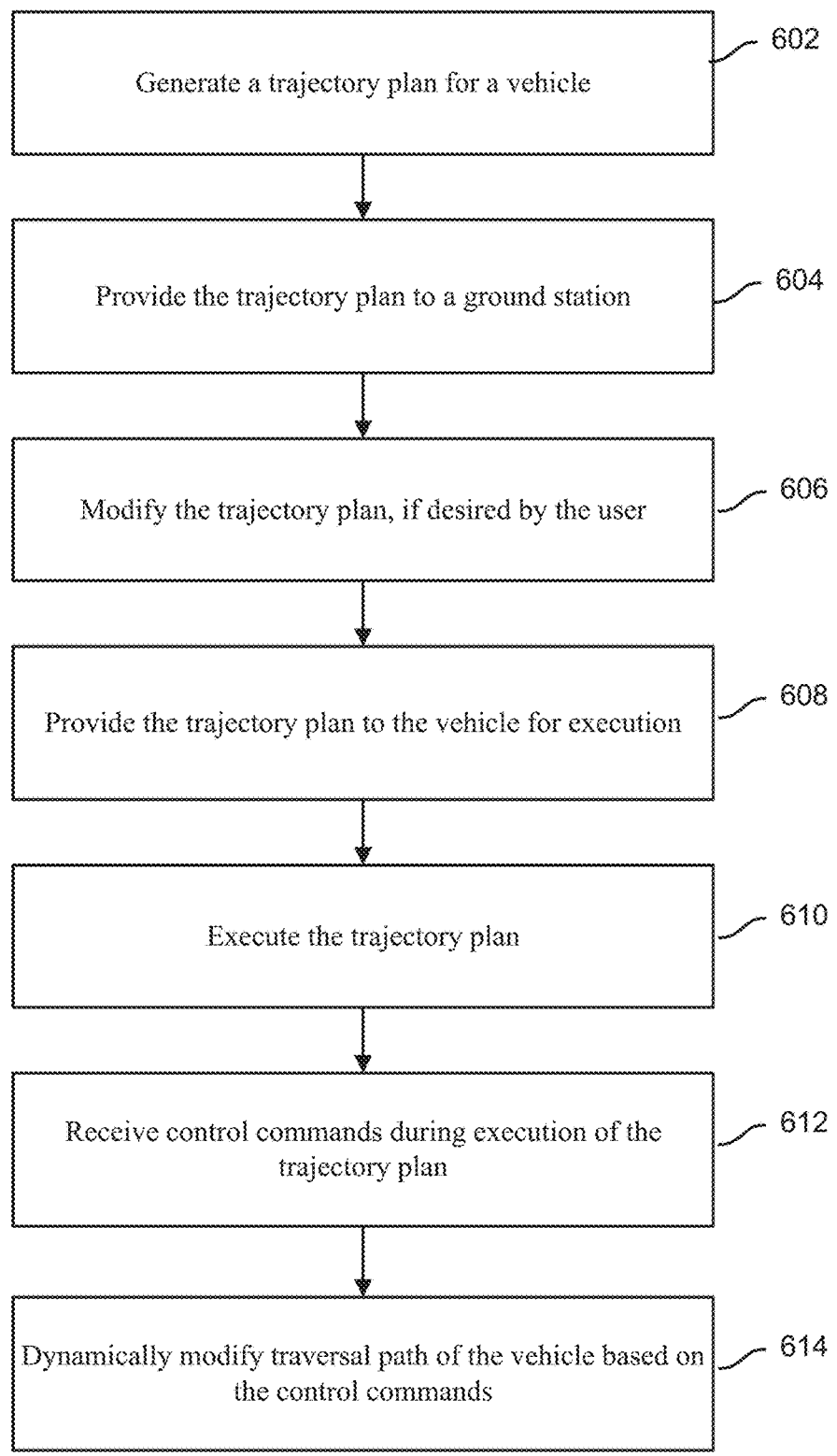
FIG. 6 is a flowchart illustrating an embodiment of a process for executing a trajectory plan.

FIG. 6 is a flowchart illustrating an embodiment of a process for executing a trajectory plan. The process of FIG. 6 may be implemented on ground station 104 and/or flight vehicle 106 of FIG. 1. In some embodiments, the process of FIG. 6 is included in 212 of FIG. 2.

At 602, a trajectory plan is generated for a vehicle. For example, a planned trajectory path is translated/packaged into a trajectory plan format for a ground station. The ground station may be a portable execution device that stores the trajectory plan and provides the trajectory plan to the execution vehicle.

At 604, the trajectory plan is provided to a ground station. Examples of the ground station include a tablet computer, a wearable computer, a mobile device, a controller, a laptop computer, and any other device configured to communicate with the execution vehicle/robot. In some embodiments, the ground station displays the received trajectory plan. For example, a list of key frames of the trajectory plan and their associated parameters are provided.

At 606, the trajectory plan is modified, if desired by the user. For example, a user is able to make tweaks to the trajectory using the ground station. In some embodiments, after the trajectory plan has been modified, an updated trajectory is calculated using at least a portion of the process of FIG. 6.

At 608, the trajectory plan is provided to the vehicle for execution. For example, the ground station converts/packages the trajectory plan into a format for execution by the vehicle/robot. In some embodiments, the trajectory plan is provided wirelessly to the vehicle/robot and the trajectory plan is processed by an onboard device of the vehicle/robot for execution.

At 610, the trajectory plan is executed. For example, the vehicle traverses a planned trajectory path of the trajectory plan and appropriately adjusts configurations of its payload. In some embodiments, although the trajectory plan identifies a specific traversal path, deviations (e.g., within a threshold) from the traversal path are allowed by the vehicle. For example, the vehicle may need to temporarily deviate from the path identified by the trajectory plan to maintain flight stability, compensate for weather/wind, and/or avoid unplanned obstacles. In some embodiments, the execution is delayed until a specified start time of the execution has been reached.

At 612, control commands are received (e.g., from a user) during execution of the trajectory plan. In some embodiments, the control commands are received from the ground station. In some embodiments, the control commands are received from a stick controller.

At 614, the traversal path of the vehicle is dynamically modified based on the control commands. In some embodiments, a user is able to dynamically adjust a speed of the execution (e.g., flight speed) during execution using commands from a stick controller and the commands from the controller are received by the vehicle/robot. Its execution is dynamically adjusted based on the commands. In some embodiments, a user is able to intervene during execution to adjust a traversal/trajectory path during execution or switch operation to manual control mode.

In some embodiments, tracking data of a tracked object is received and movement of the vehicle and/or parameters/configurations of a payload/vehicle are dynamically adjusted based on the tracking data. For example, location of the tracked object along a reference rail path is tracked and the vehicle is moved along its planned traversal path to a location that corresponds to the location of the tracked object on the reference rail path. The tracked object may be tracked using image recognition and/or via location tracking of a device coupled to the tracked object (e.g., GPS device attached to the tracked object). For example, the vehicle, a controller and/or another device in communication with the vehicle receives tracking information of the tracked object. In some embodiments, because the expected reference locations and/or the reference rail path are expected locations, the tracked object may not move exactly to the expected location point or move exactly along the reference rail location during execution. In some embodiments, during execution, the detected location of the tracked object is mapped to a closest expected reference location and/or a closest location on the reference rail path to allow the vehicle to move to the location on its trajectory path that corresponds to this closest expected reference location and/or closest location on the reference rail path.

In some embodiments, a triggering condition is received/detected and movement of the vehicle and/or parameters/configurations of a payload/vehicle are dynamically adjusted based on detection of the triggering condition. For example, the movement of the vehicle and/or parameters/configurations of a payload/vehicle is conditionally controlled dynamically during execution based on whether one or more triggering conditions have been detected.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for planning a flight path of a physical aircraft vehicle, comprising:
a processor configured to:
provide a virtual three-dimensional model of a physical environment;
track a placement indicator within the virtual three-dimensional model of the physical environment, wherein tracking the placement indicator includes tracking a location and an orientation of the placement indicator within the virtual three-dimensional model;
provide a computer rendered viewfinder display window that displays a simulated image captured from a simulated camera of a simulated vehicle located at the location of the placement indicator and oriented at a direction of the orientation of the placement indicator;
plan for the physical aircraft vehicle at least the flight path and a physical camera image capture using the placement indicator and the viewfinder display window within the virtual three-dimensional model, wherein the placement indicator has been utilized to specify based on the location and the orientation of the placement indicator at least one key frame of a plurality of key frames, a camera look-at line associated with a key frame included in the plurality of key frames is visually indicated in the virtual three-dimensional model, and the computer rendered viewfinder display window has been utilized to preview at least one key frame of the plurality of key frames;
calculate the flight path between physical locations corresponding the plurality of key frames specified in the virtual three-dimensional model; and
generate digital instructions that cause the physical aircraft vehicle to at least in part autonomously follow the calculated flight path; and
a memory coupled to the processor and configured to provide the processor with instructions.

2. The system of claim 1, wherein the virtual three-dimensional model is provided via a virtual reality headset.

3. The system of claim 1, wherein the virtual three-dimensional model is provided via an augmented reality display device.

4. The system of claim 3, wherein the virtual three-dimensional model is displayed on a surface of the physical environment.

5. The system of claim 1, wherein a specified environmental condition is simulated in the virtual three-dimensional model.

6. The system of claim 1, wherein the virtual three-dimensional model is provided via a plugin to a three-dimensional animation modeling software.

7. The system of claim 1, wherein the physical environment corresponds to a user indicated physical location where the physical aircraft vehicle will be operated.

8. The system of claim 1, wherein the virtual three-dimensional model was generated using images captured by the physical aircraft vehicle.

9. The system of claim 1, wherein the placement indicator corresponds to a physical controller and tracking the placement indicator includes translating a physical movement of the physical controller to a movement of the placement indicator.

10. The system of claim 1, wherein the placement indicator corresponds to a body part of a user.

11. The system of claim 1, wherein the placement indicator is associated with a virtual representation of the physical aircraft vehicle in the virtual three-dimensional model.

12. The system of claim 1, wherein the simulated image of the viewfinder display window was generated based on one or more specified camera configuration parameters.

13. The system of claim 1, wherein the viewfinder display window is visually coupled to the placement indicator.

14. The system of claim 1, wherein each key frame of the plurality of key frames is visually indicated in the virtual three-dimensional model.

15. The system of claim 14, wherein at least one key frame of the plurality of key frames is able to be modified by selecting and moving the corresponding visual indication of the key frame in the virtual three-dimensional model.

16. The system of claim 1, wherein a planned traversal trajectory path is visually plotted in the virtual three-dimensional model.

17. The system of claim 1, wherein the processor is further configured to provide in the virtual three-dimensional model, a preview window of a simulated video footage captured by the simulated camera of the simulated vehicle traversing a planned traversal path in the virtual three-dimensional model.

18. A method for planning a flight path of a physical aircraft vehicle, comprising:
using a processor to provide a virtual three-dimensional model of a physical environment;
tracking a placement indicator within the virtual three-dimensional model of the physical environment, wherein tracking the placement indicator includes tracking a location and an orientation of the placement indicator within the virtual three-dimensional model;
providing a computer rendered viewfinder display window that displays a simulated image captured from a simulated camera of a simulated vehicle located at the location of the placement indicator and oriented at a direction of the orientation of the placement indicator;
planning for the physical aircraft vehicle at least the flight path and a camera image capture using the placement indicator and the viewfinder display window within the virtual three-dimensional model, wherein the placement indicator has been utilized to specify based on the location and the orientation of the placement indicator at least one key frame of a plurality of key frames, a camera look-at line associated with a key frame included in the plurality of key frames is visually indicated in the virtual three-dimensional model, and the computer rendered viewfinder display window has been utilized to preview at least one key frame of the plurality of key frames;
calculating the flight path between physical locations corresponding the plurality of key frames specified in the virtual three-dimensional model; and
generating digital instructions that cause the physical aircraft vehicle to at least in part autonomously follow the calculated flight path.

19. The method of claim 18, wherein the virtual three-dimensional model is provided via a virtual reality headset.

20. A computer program product for planning a flight path of a physical aircraft vehicle, the computer program product being embodied in a non-transitory computer readable storage medium and comprising computer instructions for:
providing a virtual three-dimensional model of a physical environment;
tracking a placement indicator within the virtual three-dimensional model of the physical environment, wherein tracking the placement indicator includes tracking a location and an orientation of the placement indicator within the virtual three-dimensional model;
providing a computer rendered viewfinder display window that displays a simulated image captured from a simulated camera of a simulated vehicle located at the location of the placement indicator and oriented at a direction of the orientation of the placement indicator;
planning for the physical aircraft vehicle at least the flight path and a camera image capture using the placement indicator and the viewfinder display window within the virtual three-dimensional model, wherein the placement indicator has been utilized to specify based on the location and the orientation of the placement indicator at least one key frame of a plurality of key frames, a camera look-at line associated with a key frame included in the plurality of key frames is visually indicated in the virtual three-dimensional model, and the computer rendered viewfinder display window has been utilized to preview at least one key frame of the plurality of key frames;
calculating the flight path between physical locations corresponding the plurality of key frames specified in the virtual three-dimensional model; and
generating digital instructions that cause the physical aircraft vehicle to at least in part autonomously follow the calculated flight path.

* * * * *